United States Patent
Tsuji et al.

(10) Patent No.: US 10,000,604 B2
(45) Date of Patent: Jun. 19, 2018

(54) POLYMER AND COMPENSATION FILM AND OPTICAL FILM AND DISPLAY DEVICE

(71) Applicant: SAMSUNG ELECTRONICS CO., LTD., Suwon-si, Gyeonggi-do (KR)

(72) Inventors: Masashi Tsuji, Hwaseong-si (KR); Dmitry Androsov, Suwon-si (KR); Changki Kim, Suwon-si (KR); Hyunseok Choi, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 91 days.

(21) Appl. No.: 15/148,477

(22) Filed: May 6, 2016

(65) Prior Publication Data
US 2017/0183446 A1    Jun. 29, 2017

(30) Foreign Application Priority Data
Dec. 24, 2015 (KR) .................. 10-2015-0186668

(51) Int. Cl.
*C08G 64/04* (2006.01)
*C08G 64/28* (2006.01)
(Continued)

(52) U.S. Cl.
CPC .......... *C08G 64/045* (2013.01); *C08G 64/28* (2013.01); *C08J 5/18* (2013.01); *G02B 5/3033* (2013.01);
(Continued)

(58) Field of Classification Search
CPC ................ C08G 64/16; C08G 64/04
(Continued)

(56) References Cited

U.S. PATENT DOCUMENTS 5,807,912 A    9/1998    Wu et al.

FOREIGN PATENT DOCUMENTS

JP    2001-318233 A    11/2001
JP    2005-156685 A    6/2005
(Continued)

*Primary Examiner* — Duc Truong
(74) *Attorney, Agent, or Firm* — Cantor Colburn LLP

(57) ABSTRACT

A polymer including a first structural unit represented by Chemical Formula 1:

Chemical Formula 1

(Continued)

wherein $L^1$, $R^1$ to $R^5$ and n1 in Chemical Formula 1 are the same as described in the detailed description.

22 Claims, 3 Drawing Sheets

(51) Int. Cl.
*C08J 5/18* (2006.01)
*G02B 5/30* (2006.01)

(52) U.S. Cl.
CPC ......... *G02B 5/3083* (2013.01); *C08J 2369/00* (2013.01)

(58) Field of Classification Search
USPC ........................................................ 528/392
See application file for complete search history.

(56) References Cited

FOREIGN PATENT DOCUMENTS

| | | |
|---|---|---|
| JP | 2006-003715 A | 1/2006 |
| JP | 2015-060173 A | 3/2015 |
| KR | 2008-0102795 A | 11/2008 |
| KR | 2015-0003653 A | 1/2015 |

POLYMER AND COMPENSATION FILM AND OPTICAL FILM AND DISPLAY DEVICE

CROSS-REFERENCE TO RELATED APPLICATIONS

This application claims priority to Korean Patent Application No. 10-2015-0186668 filed in the Korean Intellectual Property Office on Dec. 24, 2015, and all the benefits accruing therefrom under 35 U.S.C. §119, the content of which is incorporated herein in its entirety by reference.

BACKGROUND

1. Field

A polymer, a compensation film, an optical film, and a display device are disclosed.

2. Description of the Related Art

A flat panel display may be classified into a light-emitting display device emitting light by itself and a non-emissive display device requiring a separate light source, wherein a compensation film or an optical film is employed for improving the image quality thereof. There remains a need in novel polymers, which can improve the properties of the existing compensation and optical films.

SUMMARY

An embodiment provides a novel polymer that is applicable to a compensation film.

Another embodiment provides a compensation film including the polymer.

Yet another embodiment provides an optical film including the compensation film.

Still another embodiment provides a display device including the compensation film.

According to an embodiment, a polymer including a first structural unit represented by Chemical Formula 1 is provided.

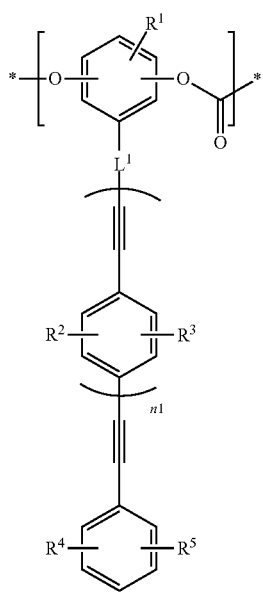

Chemical Formula 1

In Chemical Formula 1, $L^1$ is a single bond, O, C(=O), C(=O)O, or C(=O)NR$^a$, $R^1$ to $R^5$ and $R^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

The first structural unit may be represented by Chemical Formula 1-1.

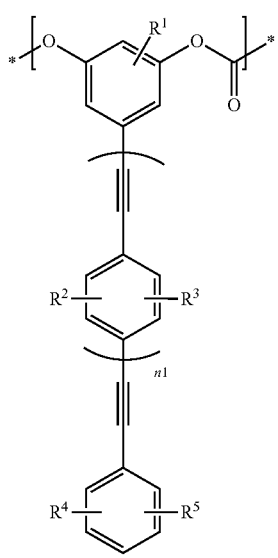

Chemical Formula 1-1

In Chemical Formula 1-1, $R^1$ to $R^5$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

The polymer may further include a second structural unit represented by Chemical Formula 2.

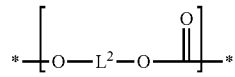

Chemical Formula 2

In Chemical Formula 2, $L^2$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, a group represented by Chemical Formula A, or a combination thereof, Chemical Formula A

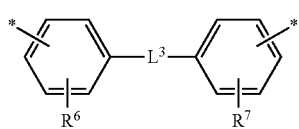

In Chemical Formula A,

L³ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, $SiR^bR^c$, S, $SO_2$, or a combination thereof, $R^6$, $R^7$, $R^b$ and $R^c$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit may be represented by one of Chemical Formulae 2-1 to 2-10.

Chemical Formula 2-1

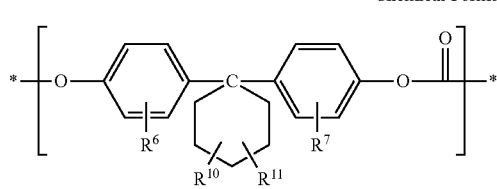

Chemical Formula 2-2

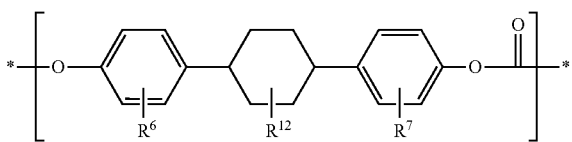

Chemical Formula 2-3

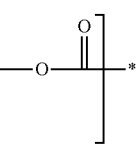

Chemical Formula 2-4

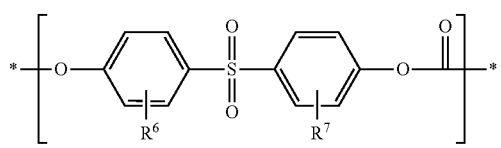

Chemical Formula 2-5

Chemical Formula 2-6

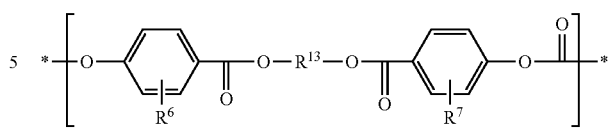

Chemical Formula 2-7

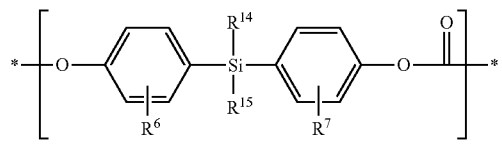

Chemical Formula 2-8

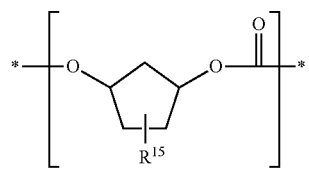

Chemical Formula 2-9

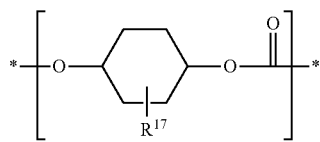

Chemical Formula 2-10

In Chemical Formulae 2-1 to 2-10, $R^6$ to $R^{12}$ and $R^{14}$ to $R^{19}$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, $R^{13}$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group or a combination thereof.

A mole ratio of the first structural unit and the second structural unit may be about 1:99 to about 99:1.

A mole ratio of the first structural unit and the second structural unit may be about 1:99 to about 50:50.

According to another embodiment, a compensation film including a first polymer having a first structural unit represented by Chemical Formula 1 is provided.

Chemical Formula 1

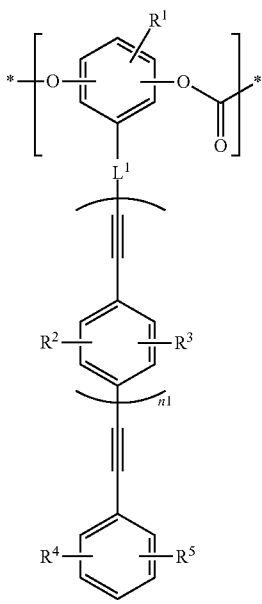

In Chemical Formula 1, $L^1$ is a single bond, O, C(=O), C(=O)O, or C(=O)NR$^a$, $R^1$ to $R^5$ and $R^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

The first structural unit may be represented by Chemical Formula 1-1.

Chemical Formula 1-1

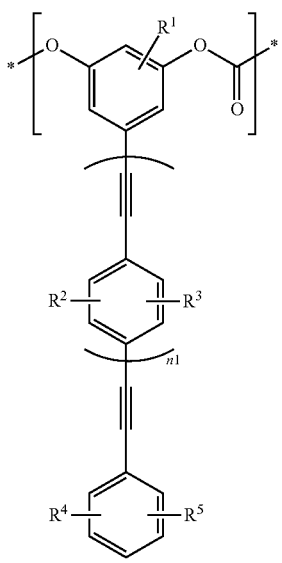

In Chemical Formula 1-1, $R^1$ to $R^5$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

The first polymer may further include a second structural unit represented by Chemical Formula 2.

Chemical Formula 2

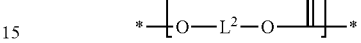

In Chemical Formula 2, $L^2$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, a group represented by Chemical Formula A, or a combination thereof, Chemical Formula A

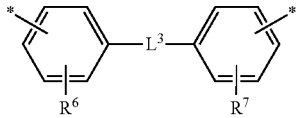

wherein, in Chemical Formula A, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, SiR$^b$R$^c$, S, SO$_2$, or a combination thereof, and $R^6$, $R^7$, $R^b$ and $R^c$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit may be represented by one of Chemical Formulae 2-1 to 2-10.

Chemical Formula 2-1

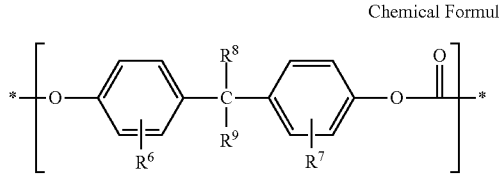

Chemical Formula 2-2

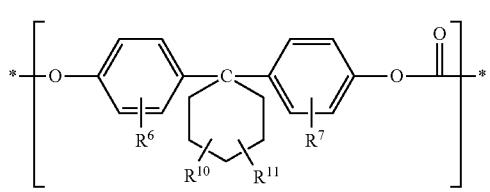

Chemical Formula 2-3
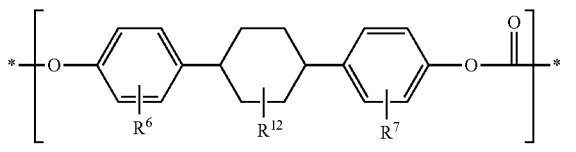

Chemical Formula 2-4
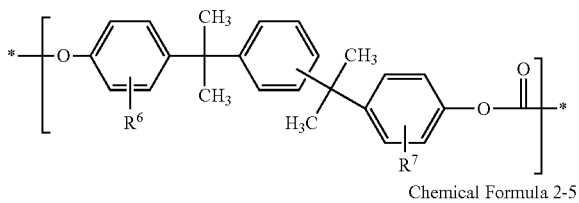

Chemical Formula 2-5
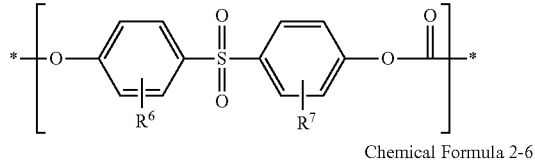

Chemical Formula 2-6
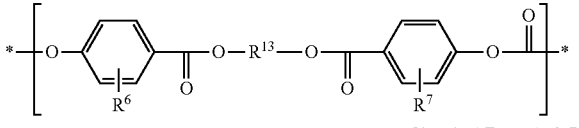

Chemical Formula 2-7
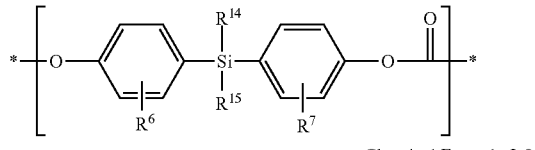

Chemical Formula 2-8
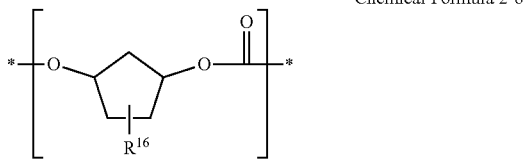

Chemical Formula 2-9
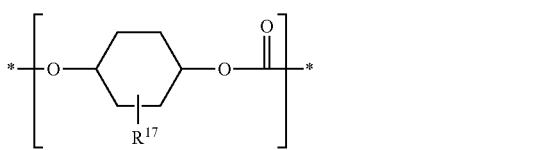

Chemical Formula 2-10
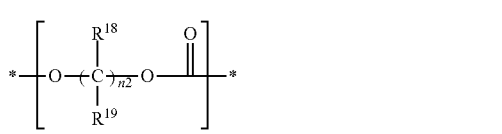

In Chemical Formulae 2-1 to 2-10, $R^6$ to $R^{12}$ and $R^{14}$ to $R^{19}$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and $R^{13}$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group or a combination thereof.

The first polymer may include the first structural unit and the second structural unit in a mole ratio of about 1:99 to about 99:1.

The first polymer may include the first structural unit and the second structural unit in a mole ratio of about 1:99 to about 50:50.

The compensation film may further include a second polymer that is different from the first polymer.

The compensation film may be uniaxially or biaxially elongated.

The compensation film may be about 1.1 times to about 5.0 times elongated.

In-phase retardation at a 550 nanometer wavelength of the compensation film may be about 10 nanometers to about 300 nanometers.

Retardation values at 450 nanometer wavelength, 550 nanometer wavelength, and 650 nanometer wavelength of the compensation film may satisfy one of Relationship Equation 1 to 5.

$R(450\text{ nm}) \geq R(550\text{ nm}) > R(650\text{ nm})$   Relationship Equation 1

$R(450\text{ nm}) > R(550\text{ nm}) \geq R(650\text{ nm})$   Relationship Equation 2

$R(450\text{ nm}) = R(550\text{ nm}) = R(650\text{ nm})$   Relationship Equation 3

$R(450\text{ nm}) \leq R(550\text{ nm}) < R(650\text{ nm})$   Relationship Equation 4

$R(450\text{ nm}) < R(550\text{ nm}) \leq R(650\text{ nm})$   Relationship Equation 5

In Relationship Equations 1 to 5, $R(450\text{ nm})$ is in-phase retardation or thickness direction retardation at a 450 nanometer wavelength, $R(550\text{ nm})$ is in-phase retardation or thickness direction retardation at a 550 nanometer wavelength, and $R(650\text{ nm})$ is in-phase retardation or thickness direction retardation at a 650 nanometer wavelength.

The first polymer may include the first structural unit and the second structural unit in a mole ratio of about 10:90 to about 20:80, and retardation values at 450 nanometer wavelength, 550 nanometer wavelength, and 650 nanometer wavelength of the compensation film may satisfy one of Relationship Equations 1 to 3.

$R(450\text{ nm}) \geq R(550\text{ nm}) > R(650\text{ nm})$   Relationship Equation 1

$R(450\text{ nm}) > R(550\text{ nm}) \geq R(650\text{ nm})$   Relationship Equation 2

$R(450\text{ nm}) = R(550\text{ nm}) = R(650\text{ nm})$   Relationship Equation 3

In Relationship Equations 1 to 3, $R(450\text{ nm})$ is in-phase retardation or thickness direction retardation at a 450 nanometer wavelength, $R(550\text{ nm})$ is in-phase retardation or thickness direction retardation at a 550 nanometer wavelength, and $R(650\text{ nm})$ is in-phase retardation or thickness direction retardation at a 650 nanometer wavelength.

The first polymer may include the first structural unit and the second structural unit in a mole ratio of about 30:70 to about 40:60, and retardation values at 450 nanometer wavelength, 550 nanometer wavelength, and 650 nanometer wavelength of the compensation film may satisfy Relationship Equation 4 or 5.

$R(450\text{ nm}) \geq R(550\text{ nm}) < R(650\text{ nm})$   Relationship Equation 4

$R(450\text{ nm}) < R(550\text{ nm}) \leq R(650\text{ nm})$   Relationship Equation 5

In Relationship Equations 4 and 5,

R(450 nm) is in-phase retardation or thickness direction retardation at a 450 nanometer wavelength, R(550 nm) is in-phase retardation or thickness direction retardation at a 550 nanometer wavelength, and R(650 nm) is in-phase retardation or thickness direction retardation at a 650 nanometer wavelength.

According to another embodiment, an optical film includes the compensation film and a polarizer.

According to yet another embodiment, a display device includes the compensation film or the optical film.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
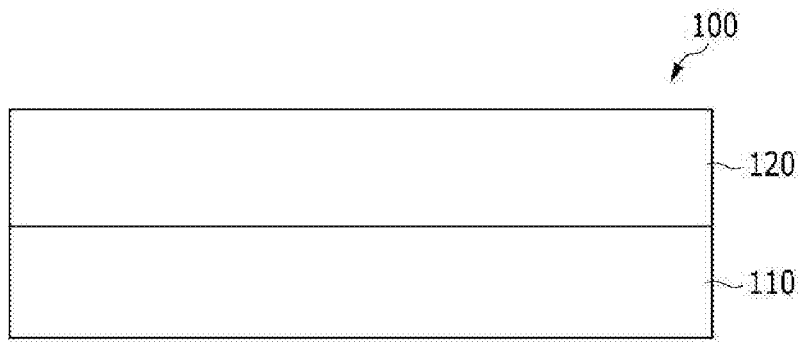
FIG. 1 is a schematic cross-sectional view showing an optical film according to an embodiment.

Exemplary embodiments of the present disclosure will hereinafter be described in detail, and may be easily performed by person having an ordinary skill in the related art. However, this disclosure may be embodied in many different forms, and is not construed as limited to the exemplary embodiments set forth herein.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As used herein, when a definition is not otherwise provided, the term "substituted" refers to a group or atom substituted with at least one substituent selected from a halogen, a hydroxy group, an alkoxy group, a nitro group, a cyano group, an amino group, an azido group, an amidino group, a hydrazino group, a hydrazono group, a carbonyl group, a carbamoyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a 01 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof, instead of hydrogen of a compound.

As used herein, when a definition is not otherwise provided, the term "alkyl group" refers to a group derived from a straight or branched chain saturated aliphatic hydrocarbon having the specified number of carbon atoms and having a valence of at least one.

As used herein, when a definition is not otherwise provided, the term "alkoxy group" refers to "alkyl-O—", wherein the term "alkyl" has the same meaning as described above.

As used herein, when a definition is not otherwise provided, the term "cycloalkyl group" refers to a monovalent group having one or more saturated rings in which all ring members are carbon.

As used herein, when a definition is not otherwise provided, the term "aryl", which is used alone or in combination, refers to an aromatic hydrocarbon containing at least one ring and having the specified number of carbon atoms. The term "aryl" may be construed as including a group with an aromatic ring fused to at least one cycloalkyl ring.

As used herein, when a definition is not otherwise provided, the term "heterocyclic group" refers to a monovalent group having one or more saturated rings including one to three heteroatom ring members selected from the group consisting of N, O, S, Se, and P, wherein the remaining ring members are carbon.

As used herein, when a definition is not otherwise provided, the term "heterocyclic group" refers to a groups having formula —SiR$_3$, wherein R is each independently selected from an alkyl group and an aryl group as defined above.

As used herein, when a definition is not otherwise provided, the term "halogen" refers to fluorine, chlorine, bromine, and iodine.

As used herein, when a definition is not otherwise provided, the term "hydroxy group" refers to "—OH".

As used herein, when a definition is not otherwise provided, the term "nitro group" refers to "—NO$_2$".

As used herein, the term "alkylene group" refers to a straight or branched saturated aliphatic hydrocarbon group having a valence of at least two, optionally substituted with one or more substituents where indicated, provided that the valence of the alkylene group is not exceeded.

As used herein, the term "cycloalkylene group" refers to a cyclic hydrocarbon group having a valence of at least two, optionally substituted with one or more substituents where indicated, provided that the valence of the cycloalkylene group is not exceeded.

As used herein, when a definition is not otherwise provided, the term "arylene group" refers to a functional group having a valence of at least two obtained by removal of two hydrogens in an aromatic ring, optionally substituted with one or more substituents where indicated, provided that the valence of the alkylene group is not exceeded.

As used herein, the term "divalent heterocyclic group" refers to a cyclic group having a valence of at least two, optionally substituted with one or more substituents where indicated, and including one to three heteroatom ring members selected from the group consisting of N, O, S, Se, and P, wherein the remaining ring members are carbon, provided that the valence of the divalent heterocyclic group is not exceeded.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1-C30 alkyl" refers to a C1-C30 alkyl group substituted with C6-C30 aryl group, the total number of carbon atoms in the resulting aryl substituted alkyl group is C7-C60.

As used herein, when a definition is not otherwise provided, the term "hetero" refers to one including 1 to 3 hetero atoms selected from N, O, S, Se, and P.

Hereinafter, a polymer according to an embodiment is described.

A polymer according to an embodiment includes one or two or more structural units, and may include a first structural unit represented by Chemical Formula 1.

Chemical Formula 1

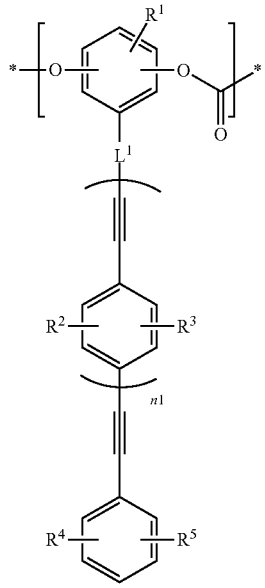

In Chemical Formula 1,

L$^1$ is a single bond, O, C(=O), C(=O)O, or C(=O)NR$^a$,

R$^1$ to R$^5$ and R$^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

The polymer may include a main chain having a carbonate group and a side chain having a phenylacetylene group. The side chain having a phenylacetylene group is disposed with respect to a main chain in a substantially perpendicular direction, and thus the polymer may have predetermined optical properties. For example, the polymer may control birefringence depending on a wavelength by varying a refractive index in a main chain direction and a refractive index in a side chain direction.

The first structural unit may be, for example represented by Chemical Formula 1-1.

Chemical Formula 1-1

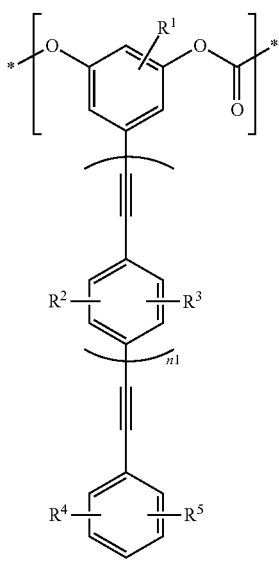

In Chemical Formula 1-1, $R^1$ to $R^5$ and n1 are the same as described above.

The polymer may further include a second structural unit represented by Chemical Formula 2.

Chemical Formula 2

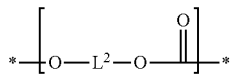

In Chemical Formula 2, $L^2$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, a group represented by Chemical Formula A, or a combination thereof, Chemical Formula A

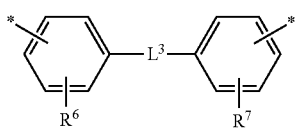

in Chemical Formula A, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, $SiR^bR^c$, S, $SO_2$, or a combination thereof, and $R^6$, $R^7$, $R^b$, and $R^c$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit may be, for example represented by one of Chemical Formulae 2-1 to 2-10, but is not limited thereto.

Chemical Formula 2-1

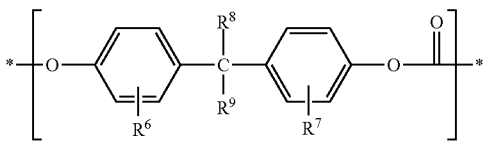

Chemical Formula 2-2

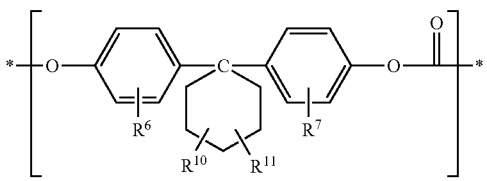

Chemical Formula 2-3

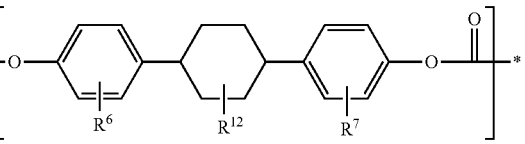

Chemical Formula 2-4

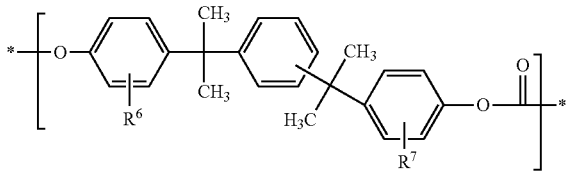

Chemical Formula 2-5

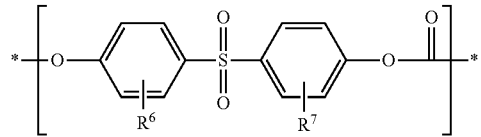

Chemical Formula 2-6

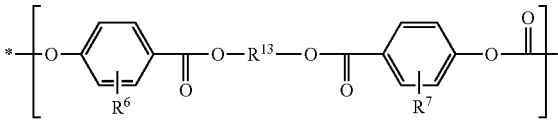

Chemical Formula 2-7

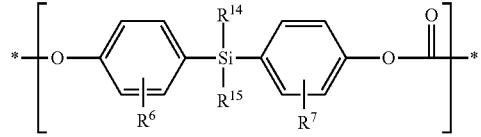

Chemical Formula 2-8

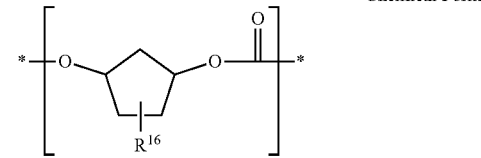

Chemical Formula 2-9

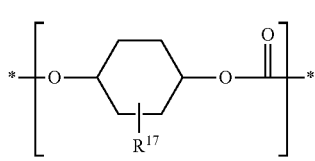

Chemical Formula 2-10

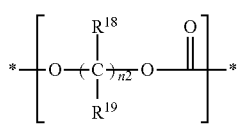

In Chemical Formulae 2-1 to 2-10, $R^6$ to $R^{12}$ and $R^{14}$ to $R^{19}$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and $R^{13}$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group or a combination thereof.

When the polymer has the first structural unit and the second structural unit, the first structural unit and the second structural unit may be included in a mole ratio of about 1:99 to about 99:1. Within this range, flexibility is improved, and thus the polymer may be easily transformed into a film with desirable optical properties. Within the above range, the first and second structural units may be, for example included in a mole ratio of about 1:99 to about 50:50.

The polymer may be amorphous, and may have, for example a glass transition temperature of about 120° C. to about 280° C., for example about 180° C. to about 250° C.

A weight average molecular weight of the polymer may be consistent with its inherent viscosity of about 0.2 deciliters per gram (dl/g) to about 2.0 dl/g, for example about 0.3 dl/g to about 1.0 dl/g. Within this range, formability and productivity of a film may be effective.

The polymer may be synthesized by a known polymerization method, for example a synthesis method using a dihydro compound and a phosgene compound such as triphosgene, a synthesis method using a dihydro compound and a carbonate ester, a synthesis method using a dihydro compound and an active carbonate derivative, and the like, without limitation.

The polymer may be, for example prepared in a form of a film, and thus may be used as a polymer film. The polymer film may be prepared, for example by a melt-extrusion method or a solution casting, without limitation. When the polymer film is prepared using the solution casting, methylene chloride, tetrahydrofuran, dioxolane, dioxane, dimethylsulfoxide, dimethylformamide, dimethylacetamide, or a combination thereof may be for example used, without limitation. The polymer film may be, for example transparent, and thus may be applicable to anything that requires transparency. The polymer film may be used for various applications, for example for a substrate, a protective film, a compensation film, an optical film, a dielectric layer, an insulation layer, an adhesive layer, and the like.

Hereinafter, a compensation film according to an embodiment is described.

A compensation film according to an embodiment includes one or more kinds of a polymer.

The compensation film may include a first polymer having a first structural unit.

Chemical Formula 1

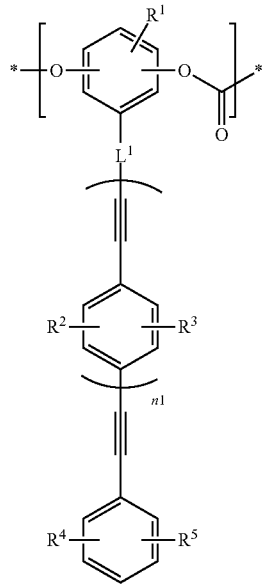

In Chemical Formula 1, $L^1$ is a single bond, O, C(=O), C(=O)O, or C(=O)$NR^a$, $R^1$ to $R^5$ and $R^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

The first polymer may include a main chain having a carbonate bond and a side chain having a phenylacetylene group. The side chain having a phenylacetylene group is disposed with respect to a main chain in a substantially perpendicular direction, and thus the first polymer may have predetermined optical properties. For example, the first polymer may control birefringence depending on a wavelength by varying a refractive index in a main chain direction and a refractive index in a side chain direction.

The first structural unit may be, for example represented by Chemical Formula 1-1.

Chemical Formula 1-1

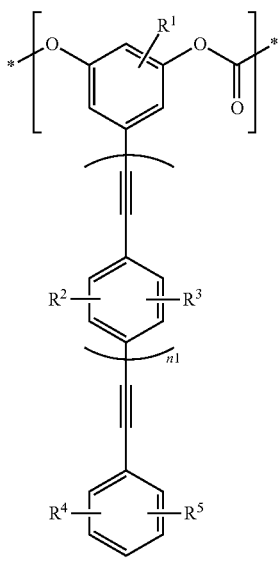

In Chemical Formula 1-1, $R^1$ to $R^5$ and n1 are the same as described above.

The first polymer may further include a second structural unit represented by Chemical Formula 2.

Chemical Formula 2

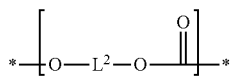

In Chemical Formula 2, $L^2$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, a group represented by Chemical Formula A, or a combination thereof, Chemical Formula A

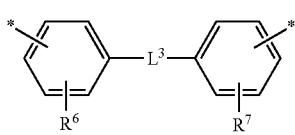

in Chemical Formula A, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, $SiR^bR^c$, S, $SO_2$, or a combination thereof, and $R^6$, $R^7$, $R^b$ and $R^c$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

The second structural unit may be, for example represented by one of Chemical Formulae 2-1 to 2-10, but is not limited thereto.

Chemical Formula 2-1

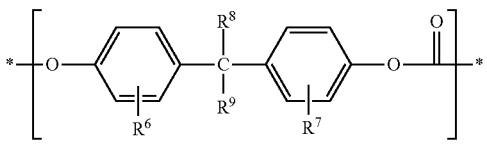

Chemical Formula 2-2

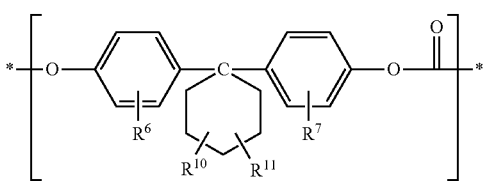

Chemical Formula 2-3

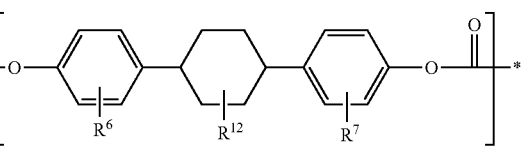

Chemical Formula 2-4

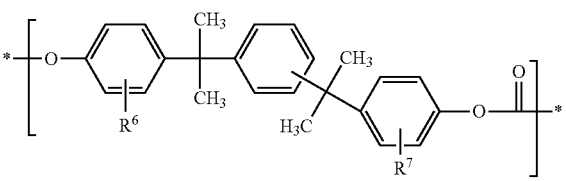

Chemical Formula 2-5

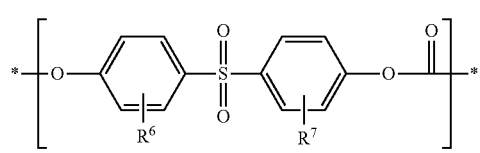

Chemical Formula 2-6

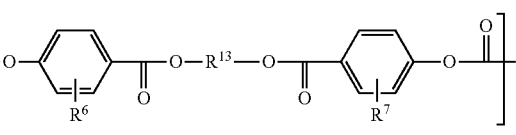

Chemical Formula 2-7

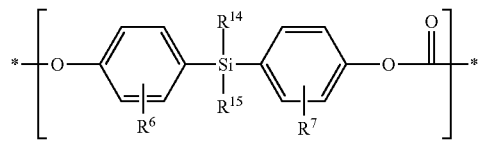

Chemical Formula 2-8

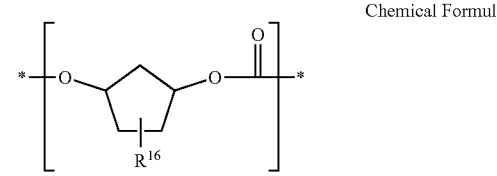

-continued

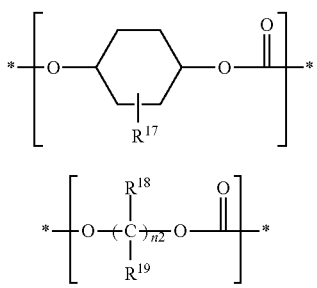

Chemical Formula 2-9

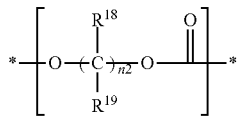

Chemical Formula 2-10

In Chemical Formulae 2-1 to 2-10, $R^6$ to $R^{12}$ and $R^{14}$ to $R^{19}$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and $R^{13}$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group or a combination thereof.

When the first polymer has the first structural unit and the second structural unit, the first structural unit and the second structural unit may be included in a mole ratio of about 1:99 to about 99:1. Within the range, flexibility is improved, and thus the first polymer may be easily transformed into a film having desirable optical properties. Within the above range, the first and second repeating units may be, for example included in a mole ratio of about 1:99 to about 50:50, for example about 10:90 to about 50:50.

The compensation film may further include at least one second polymer in addition to the first polymer. Optical and physical characteristics of the compensation film may be improved due to the presence of the second polymer. The second polymer is not particularly limited as long as it improves characteristics of the compensation film, and may have, for example a structural unit including a substituted or unsubstituted arylene group and a carbonate group.

The compensation film may be, for example uniaxially or biaxially elongated. For example, the compensation film may be elongated in a uniaxial direction.

The compensation film may have a predetermined retardation refractive index and light absorption characteristics depending on a wavelength as described above.

The retardation (R) of the compensation film may be obtained as an in-plane retardation ($R_o$) and as a thickness direction retardation ($R_{th}$). The in-plane retardation ($R_o$) of the compensation film occurs in an in-plane direction of compensation film and may be expressed as $R_o=(n_x-n_y)d$. The thickness direction retardation ($R_{th}$) of the compensation film occurs in a thickness direction and may be expressed as $R_{th}=\{[(n_x+n_y)/2]-n_z\}d$. Herein $n_x$ is a refractive index in a direction having a highest in-phase refractive index of the compensation film (hereinafter referred to as "slow axis"), $n_y$ is a refractive index in a direction having a lowest in-phase refractive index of the compensation film (hereinafter referred to as a "fast axis"), $n_z$ is a refractive index in a direction perpendicular to the slow axis and the fast axis of the compensation film, and d is a thickness of the compensation.

For example, in-phase retardation at a 550 nanometer (nm) wavelength of the compensation film ($R_o$) may be about 10 nm to about 300 nm. The compensation film may have an in-plane retardation and a thickness direction retardation within a predetermined range by changing the $n_x$, $n_y$, $n_z$, and/or a thickness (d).

A retardation of the compensation film may be the same or different depending on a wavelength.

For example, the compensation film may have a forward wavelength dispersion phase delay where a retardation of light at a shorter wavelength is larger than a retardation of light at a longer wavelength. When a 550 nm wavelength is a reference wavelength, for example retardation values (R) at 450 nm, 550 nm, and 650 nm wavelengths of the compensation film may satisfy Relationship Equation 1 or 2.

$R(450 \text{ nm}) \geq R(550 \text{ nm}) > R(650 \text{ nm})$  Relationship Equation 1

$R(450 \text{ nm}) > R(550 \text{ nm}) \geq R(650 \text{ nm})$  Relationship Equation 2

For example, the compensation film may have a flat dispersion phase delay where a retardation of light at a longer wavelength and a retardation of light at a shorter wavelength are substantially equivalent. For example retardation values (R) in 450 nm, 550 nm, and 650 nm wavelengths of the compensation film may satisfy Relationship Equation 3.

$R(450 \text{ nm}) = R(550 \text{ nm}) = R(650 \text{ nm})$  Relationship Equation 3

For example, the compensation film may have a reverse wavelength dispersion phase delay where a retardation of light at a longer wavelength is larger than a retardation of light at a shorter wavelength. For example retardation values (R) in 450 nm, 550 nm, and 650 nm wavelengths of the compensation film may satisfy Relationship Equation 4 or 5.

$R(450 \text{ nm}) \leq R(550 \text{ nm}) < R(650 \text{ nm})$  Relationship Equation 3

$R(450 \text{ nm}) < R(550 \text{ nm}) \leq R(650 \text{ nm})$  Relationship Equation 5

In Relationship Equations 1 to 5,

R(450 nm) is in-phase retardation or thickness direction retardation at a 450 nm wavelength, R(550 nm) is in-phase retardation or thickness direction retardation at a 550 nm wavelength, and R(650 nm) is in-phase retardation or thickness direction retardation at a 650 nm wavelength.

The retardation of the compensation film may be controlled as desired depending on a wavelength.

The compensation film may have a relatively low thickness due to high birefringence. The compensation film may have, for example a thickness of about 3 micrometers (μm) to about 200 μm, for example about 5 μm to about 150 μm, or about 5 μm to about 100 μm.

The compensation film includes a substantially transparent polymer, and thus may be used as a substrate and a separate substrate under the compensation film may be omitted. Thereby, a thickness of the compensation film may be further reduced. Accordingly, the compensation film may be effectively applied in a flexible display device such as a foldable display device or a bendable display device and may have improve optical properties and display characteristics.

The compensation film may be manufactured by a method, including for example preparing monomers, polymerizing the monomers to prepare a polymer, preparing the polymer in a form of a film, and elongating the film.

The compensation film may be, for example elongated at an elongation rate of about 110% to about 1,000% at a temperature of about 50° C. to about 500° C. The elongation rate refers to a length ratio of after the elongation to before the elongation of the compensation film, and is an expression of the elongation extent of the compensation film after uniaxial elongation.

The compensation film may be used alone or together with other compensation film.

The compensation film may be used with a polarizer which may serve as an optical film to prevent reflection of external light of a display device. The optical film may be, for example an antireflective film, but is not limited thereto.

Figure 2:
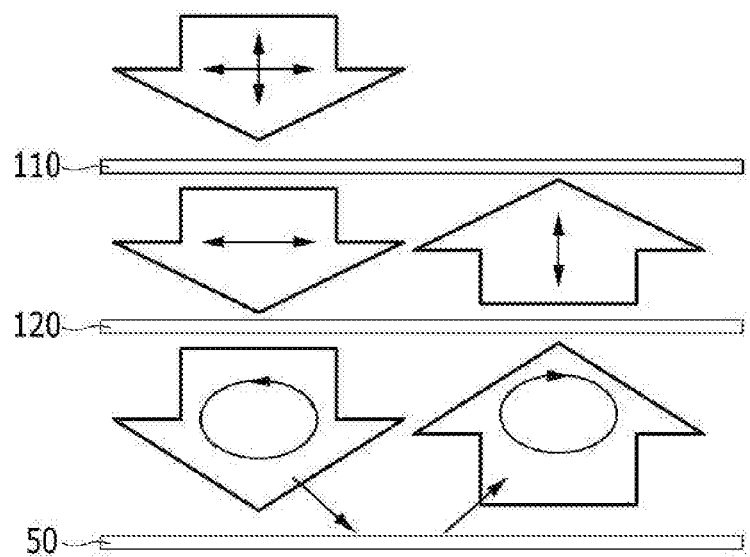
FIG. 2 is a schematic view showing the external light anti-reflection principle of an optical film.
Figure 3:
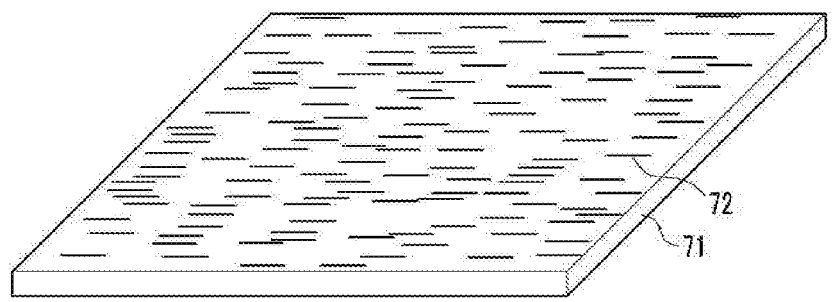
FIG. 3 is a schematic view of an example of a polarizing film.

FIG. 1 is a schematic cross-sectional view showing an optical film according to an embodiment, FIG. 2 is a schematic view showing the external light anti-reflection principle of an optical film, and FIG. 3 is a schematic view of an example of a polarizing film.

Referring to FIG. 1, an optical film 100 according to an embodiment includes a polarizer 110 and a compensation film 120. The compensation film 120 may circularly polarize light passed through the polarizer 110 to generate retardation, and may influence reflection and/or absorption of light.

For example, the optical film 100 may be mounted on one side or both sides of the display device, and particularly, may prevent light from flowing into the display part of the display device from the outside (hereinafter referred to as "external light") from being reflected. Accordingly, the optical film 100 may prevent the visibility deterioration caused by the external light reflection.

FIG. 2 is a schematic view showing the external light anti-reflection principle of an optical film.

Referring to FIG. 2, while the incident unpolarized light having entered from the outside is passed through the polarizer 110, and the polarized light is shifted into circularly polarized light by passing through the compensation film 120, only a first polarized perpendicular component, which is one polarized perpendicular component of two polarized perpendicular components, is transmitted. While the circularly polarized light is reflected in a display panel 50 including a substrate, an electrode, and so on, and changes the circular polarization direction, and the circularly polarized light is passed through the compensation film 120 again, only a second polarized perpendicular component, which is the other polarized perpendicular component of the two polarized perpendicular components, may be transmitted. As the second polarized perpendicular component is not passed through the polarizer 110, and light does not exit to the outside, effects of preventing the external light reflection may be provided.

The polarizer 110 may be, for example a polarizing plate or a polarization film.

Referring to FIG. 3, the polarizer 110 may be a self-integrated polarizing film made of, for example a melt blend of a polymer 71 and a dichroic dye 72.

The polymer 71 may be, for example a hydrophobic polymer, for example a polyolefin such as polyethylene (PE), polypropylene (PP), and a copolymer thereof; a polyamide such as nylon and aromatic polyamide; a polyester such as polyethylene terephthalate (PET), polyethylene terephthalate glycol (PETG), and polyethylene naphthalate (PEN); a polyacryl such as polymethyl (meth)acrylate; a polystyrene such as polystyrene (PS) and an acrylonitrile-styrene copolymer; a polycarbonate; a vinyl chloride polymer; a polyimide; a sulfone polymer; a polyethersulfone; a polyether-etherketone; a polyphenylene sulfide; a vinyl alcohol polymer; a vinylidene chloride polymer; a vinyl butyral polymer; an allylate polymer; a polyoxymethylene; epoxy, a copolymer thereof, or a combination thereof.

In an embodiment, the polymer 71 may be, for example a polyolefin, a polyamide, a polyester, a (meth)acrylic polymer, a polystyrene, a copolymer thereof, or a combination thereof, and may be, for example polyethylene (PE), polypropylene (PP), polyethyleneterephthalate (PET), polyethyleneterephthalateglycol (PETG), polyethylene naphthalate (PEN), nylon, a copolymer thereof, or a combination thereof.

In an embodiment, the polymer 71 may be polyolefin. The polyolefin may be, for example a mixture of two or more selected from polyethylene (PE), polypropylene (PP), a copolymer of polyethylene and polypropylene (PE-PP), for example a mixture of polypropylene (PP) and a polyethylene-polypropylene copolymer (PE-PP).

The polymer 71 may have a transmittance of greater than or equal to about 85% in a wavelength region of about 400 nm to about 780 nm. The polymer 71 may be elongated in a uniaxial direction. The uniaxial direction may be the same as a length direction of the dichroic dye 72 which will be described later.

The dichroic dye 72 may be dispersed in the polymer 71, and may be and aligned in the elongation direction of the polymer 71. The dichroic dye 72 transmits one perpendicular polarization component out of two perpendicular polarization components in a predetermined wavelength region.

The dichroic dye 72 may be included in an amount of about 0.01 to about 5 parts by weight or about 0.1 to about 5 parts based on 100 parts by weight of the polymer 71. Within these ranges, sufficient polarization characteristics may be obtained without deteriorating transmittance of a polarization film. Within the above ranges, the dichroic dye may be included in an amount of about 0.05 to about 1 part by weight or about 0.5 to about 1 part by weight based on 100 parts by weight of the polymer 71.

The polarizer 110 may have a relatively low thickness of less than or equal to about 100 μm, for example, for example about 30 μm to about 95 μm. When the polarizer 110 has a thickness with the above ranges, the polarizer 110 is thinner than a polyvinyl alcohol polarizing plate requiring a protective layer such as triacetyl cellulose (TAC), and thus may realize a thin display device.

The compensation film 120 may be the same as described above.

The optical film 100 may further include a correction layer (not shown) positioned on one side of the compensation film 120. The correction layer may be, for example, a color shift resistant layer, but is not limited thereto.

The optical film 100 may further include a light blocking layer (not shown) extended along the edge. The light blocking layer may be formed in a strip along the circumference of the optical film 100, and for example, may be positioned between the polarizer 110 and the compensation film 120. The light blocking layer may include an opaque material, for example, a black material. For example, the light blocking layer may be made of a black ink.

The optical film 100 may be applied to various display devices.

A display device according to an embodiment includes a display panel and an optical film positioned on one side of the display panel. The display panel may be a liquid crystal panel or organic light emitting panel, but is not limited thereto.

Hereinafter, an organic light emitting device is described as an example of a display device.

Figure 4:
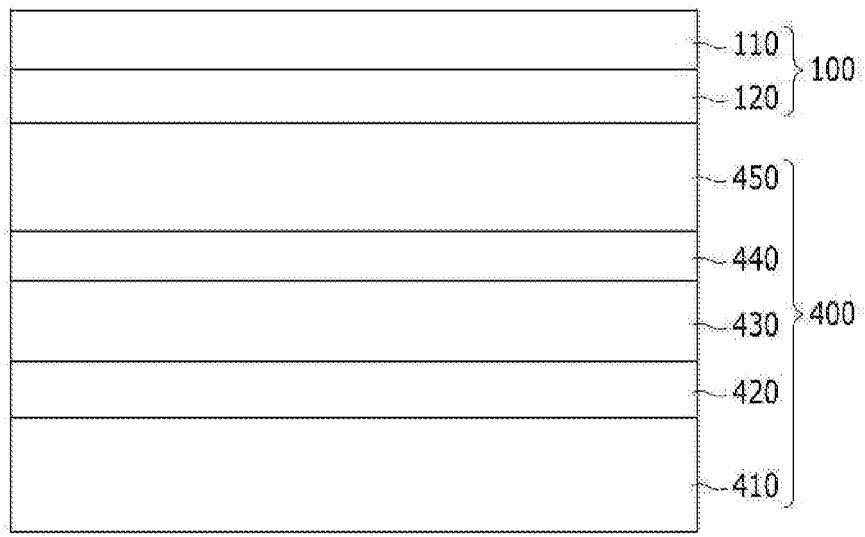
FIG. 4 is a schematic cross-sectional view showing an organic light emitting device according to an embodiment.

FIG. 4 is a schematic cross-sectional view showing an organic light emitting device according to an embodiment.

Referring to FIG. 4, the organic light emitting device according to an embodiment includes an organic light emitting panel 400 and an optical film 100 positioned on one side of the organic light emitting diode panel 400.

The organic light emitting diode panel 400 may include a base substrate 410, a lower electrode 420, an organic emission layer 430, an upper electrode 440, and an encapsulation substrate 450.

The base substrate 410 may be made of glass or plastic.

At least one of the lower electrode 420 and the upper electrode 440 may be an anode, and the other one may be a cathode. The anode is an electrode injected with holes, and may be made of a transparent conductive material having a high work function to transmit the emitted light to the outside, for example, ITO or IZO. The cathode is an electrode injected with electrons, and may be made of a conductive material having a low work function and not affecting the organic material. The cathode may be selected from, for example, aluminum (Al), calcium (Ca), and barium (Ba).

The organic emission layer 430 includes an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer is used to balance electrons and holes, and may include a hole transport layer, a hole injection layer (HIL), an electron injection layer (EIL), and an electron transporting layer.

The encapsulation substrate 450 may be made of glass, metal, or a polymer, and may seal the lower electrode 420, the organic emission layer 430, and the upper electrode 440 to prevent moisture and/or oxygen inflow from the outside.

The optical film 100 may be disposed on the light-emitting side. For example, when a bottom emission structure emits light at the side of the base substrate 410, the optical film 100 may be disposed on the exterior side of the base substrate 410. On the other hand, when a top emission structure emits light at the side of the encapsulation substrate 450, the optical film 100 may be disposed on the exterior side of the encapsulation substrate 450.

The optical film 100 includes the self-integrated polarizer 110 and the self-integrated compensation film 120. The polarizer 110 and the compensation film 120 are respectively the same as described above, and may prevent a display device from having visibility deterioration caused by light inflowing from the outside after passing the polarizer 110 and being reflected by a metal such as an electrode and the like in the organic light emitting panel 400. Accordingly, display characteristics of the organic light emitting device may be improved.

Hereinafter, a liquid crystal display (LCD) is described as an example of the display device.

Figure 5:
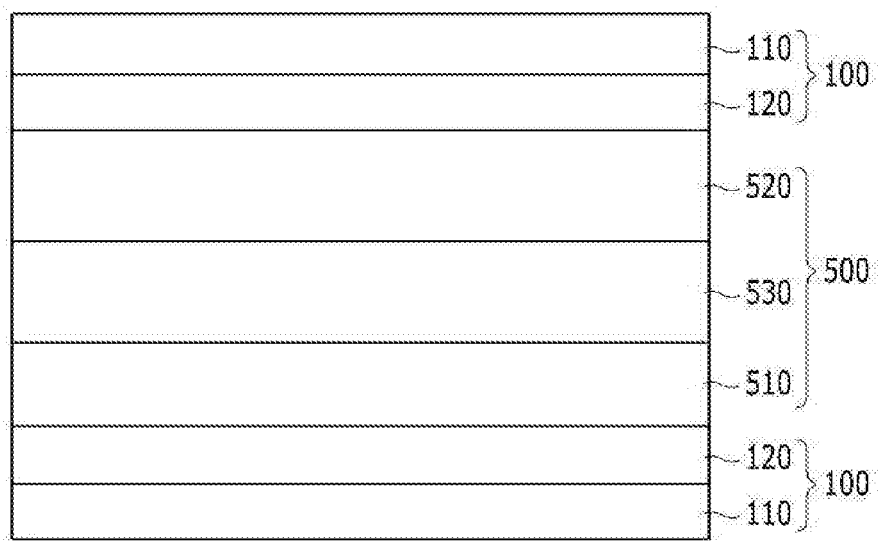
FIG. 5 is a schematic cross-sectional view showing a liquid crystal display according to an embodiment.

FIG. 5 is a schematic cross-sectional view showing a liquid crystal display according to an embodiment.

Referring to FIG. 5, the liquid crystal display (LCD) according to an embodiment includes a liquid crystal display panel 500, and an optical film 100 positioned on one side or both sides of the liquid crystal panel 500.

The liquid crystal panel 500 may be a twist nematic (TN) mode panel, a vertical alignment (PVA) mode panel, an in-plane switching (IPS) mode panel, an optically compensated bend (OCB) mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same, and the second display panel 520 may include, for example, a color filter (not shown) formed on a substrate (not shown) and a second electric field generating electrode (not shown). However, it is not limited thereto, and the color filter may be included in the first display panel 510, while the first electric field generating electrode and the second electric field generating electrode may be disposed on the first display panel 510 together therewith.

The liquid crystal layer 530 may include a plurality of liquid crystal molecules. The liquid crystal molecules may have positive or negative dielectric anisotropy. When the liquid crystal molecules has positive dielectric anisotropy, the major axes thereof may be aligned substantially parallel to the surface of the first display panel 510 and the second display panel 520 when an electric field is not applied, and the major axes may be aligned substantially perpendicular to the surface of the first display panel 510 and second display panel 520 when an electric field is applied. On the other hand, when the liquid crystal molecules have negative dielectric anisotropy, the major axes may be aligned substantially perpendicular to the surface of the first display panel 510 and the second display panel 520 when an electric field is not applied, and the major axes may be aligned substantially parallel to the surface of the first display panel 510 and the second display panel 520 when an electric field is applied.

The optical film 100 may be disposed on the outside of the liquid crystal panel 500. Although the optical film 100 is shown to be provided on both the lower part and the upper part of the liquid crystal panel 500 in the drawing, it is not limited thereto, and it may be formed on only one of the lower part and the upper part of the liquid crystal panel 500.

Hereinafter, the present disclosure is illustrated in more detail with reference to the examples. However, these examples are exemplary, and the present disclosure is not limited thereto.

EXAMPLES

Synthesis of Polymer

Synthesis Example 1

(1) Step 1

Reaction Scheme 1

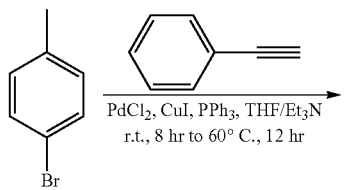

(2) Step 2

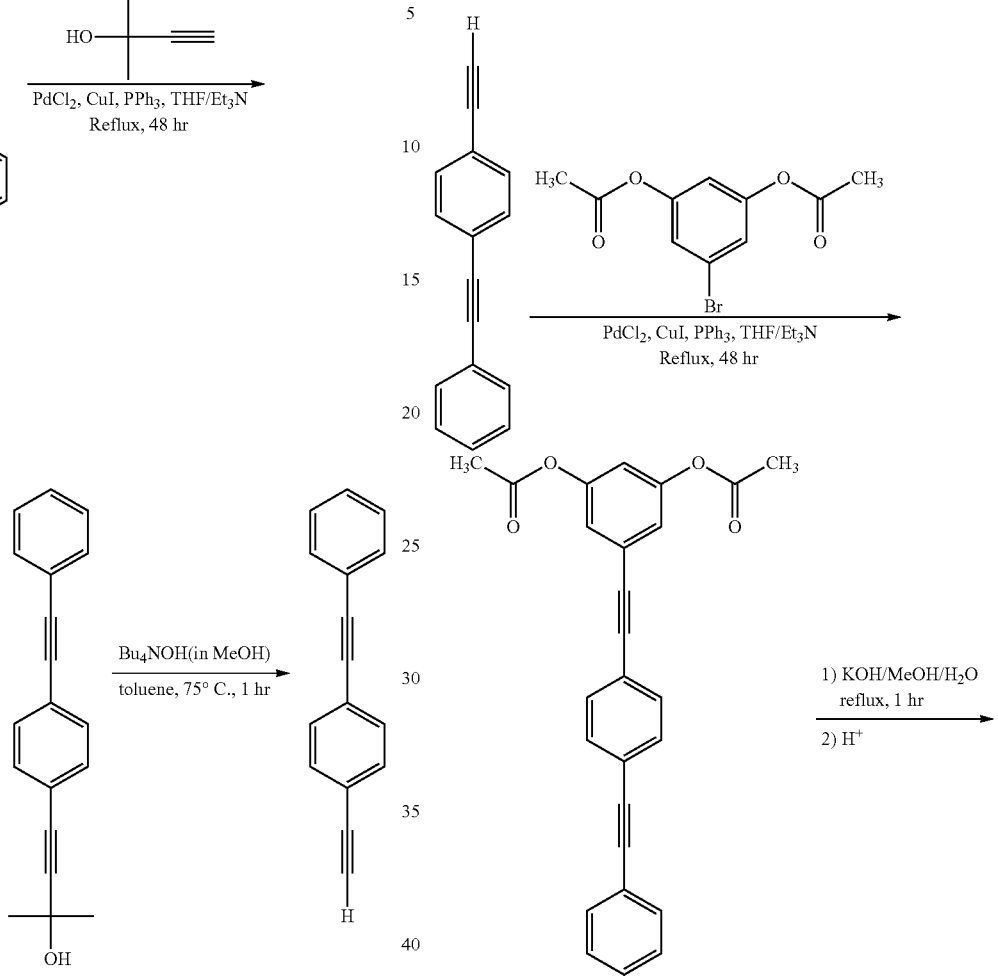

Reaction Scheme 2

141 grams (g) of 1-bromo-4-iodine benzene, 50.9 g of phenylacetylene, 700 milliliters (ml) of triethyamine, and 700 ml of tetrahydrofuran are placed in a 2 liter (L) flask filled with nitrogen gas. Subsequently, 0.882 g of palladium chloride (II) (PbCl₂), 1.91 g of copper iodide (I) (CuI), and 5.21 g of triphenylphosgene (PPh₃) are added thereto, and the mixture is stirred in a nitrogen atmosphere at room temperature for 8 hours. After the resultant has been stirred at 60° C. for 12 hours, 50.6 g of 2-methyl-3-butyne-2-ol, 0.435 g of palladium chloride (II), 0.956 g of copper iodide (I), and 2.66 g of triphenylphosphine are added thereto, and the mixture is refluxed for 48 hours. Subsequently, insoluble materials are filtered and separated, and the remaining solvent is distilled under a reduced pressure and recrystallized with ethyl acetate, to obtain 104 g of 2-methyl-4-(phenylethynyl)phenyl)buta-3-en-2-ol.

Subsequently, 61.8 g of the 2-methyl-4-(phenylethynyl) buta-3-en-2-ol, 74.1 ml of tetramethyl ammonium hydroxide (a 10% methanol solution), and 1,160 ml of toluene are placed in a 2 L flask and stirred at 75° C. under a pressure of 0.3 atmospheres (atm) for 1 hour. Subsequently, 47.0 g of 1-ethynyl-4-(phenylethynyl)benzene is obtained by washing the reaction solution with water, distilling a solvent therein under a reduced pressure, and purifying the resultant by column chromatography.

14.9 g of 1-ethynyl-4-(phenylethynyl)benzene, 20.1 g of 5-bromo-1,3-phenylene diacetylate, and 350 ml of triethylamine are placed in a 1 L flask filled with nitrogen gas. Subsequently, 0.130 g of palladium chloride (II), 0.274 g of copper iodide (I), and 0.766 g of triphenylphosphine are added thereto, and the mixture is stirred under reflux in a nitrogen atmosphere for 48 hours. Subsequently, the resultant is cooled to room temperature, and an insoluble matter is filtered and separated. The solvent is distilled under a reduced pressure, and the residue is purified by column chromatography, to obtain 28.0 g of 5-((4-phenylethynyl)phenyl)ethynyl)1,3-phenylene diacetate.

Then, 28.0 g of 5-((4-phenylethynyl)phenyl)ethynyl)1,3-phenylene diacetate, 15.9 g of potassium hydroxide, 1,120 ml of methanol, and 28 ml of water are placed in a 2 L flask and stirred and refluxed for 1 hour. The resultant is cooled to room temperature and neutralized with 1 normal (N) HCl. Subsequently, a solvent is distilled off under a reduced pressure to about 1/3 of the initial amount, and a solid precipitated therein is filtered and separated. The solid is washed with water and vacuum-dried at 60° C. The obtained product is purified by column chromatography, to obtain 5.66 g of 5-((4-(phenylethynyl)phenyl)ethynyl)benzene-1,3-diol.

(3) Step 3

1.94 g of sodium hydroxide, 29 mL of water, 0.302 g of 5-((4-(phenylethynyl)phenyl)ethynyl)benzene-1,3-diol, and 2.00 g of 2,2-bis(4-hydroxyphenyl)propane are placed in a 200 mL flask equipped with a mechanical agitator. Subsequently, 1.44 g of triphosgene dissolved in 32 mL of dichloromethane is added thereto, and the mixture is stirred for 15 minutes. Then, 9 mg of triethylamine is added thereto, and the obtained mixture is stirred at room temperature for 90 minutes. Then, the resultant is diluted with dichloromethane, washed with 1% aqueous hydrochloric acid solution and water, re-precipitated by using methanol, and vacuum-dried at 60° C. for 12 hours, to obtain 2.10 g of polycarbonate.

In Reaction Scheme 3, x:y is about 9:1.

Synthesis Example 2

Steps 1 and 2 are the same in Synthesis Example 1.
Step 3:
1.64 g of sodium hydroxide, 24 mL of water, 0.509 g of 5-((4-(phenylethynyl)phenyl)ethynyl)benzene-1,3-diol, and

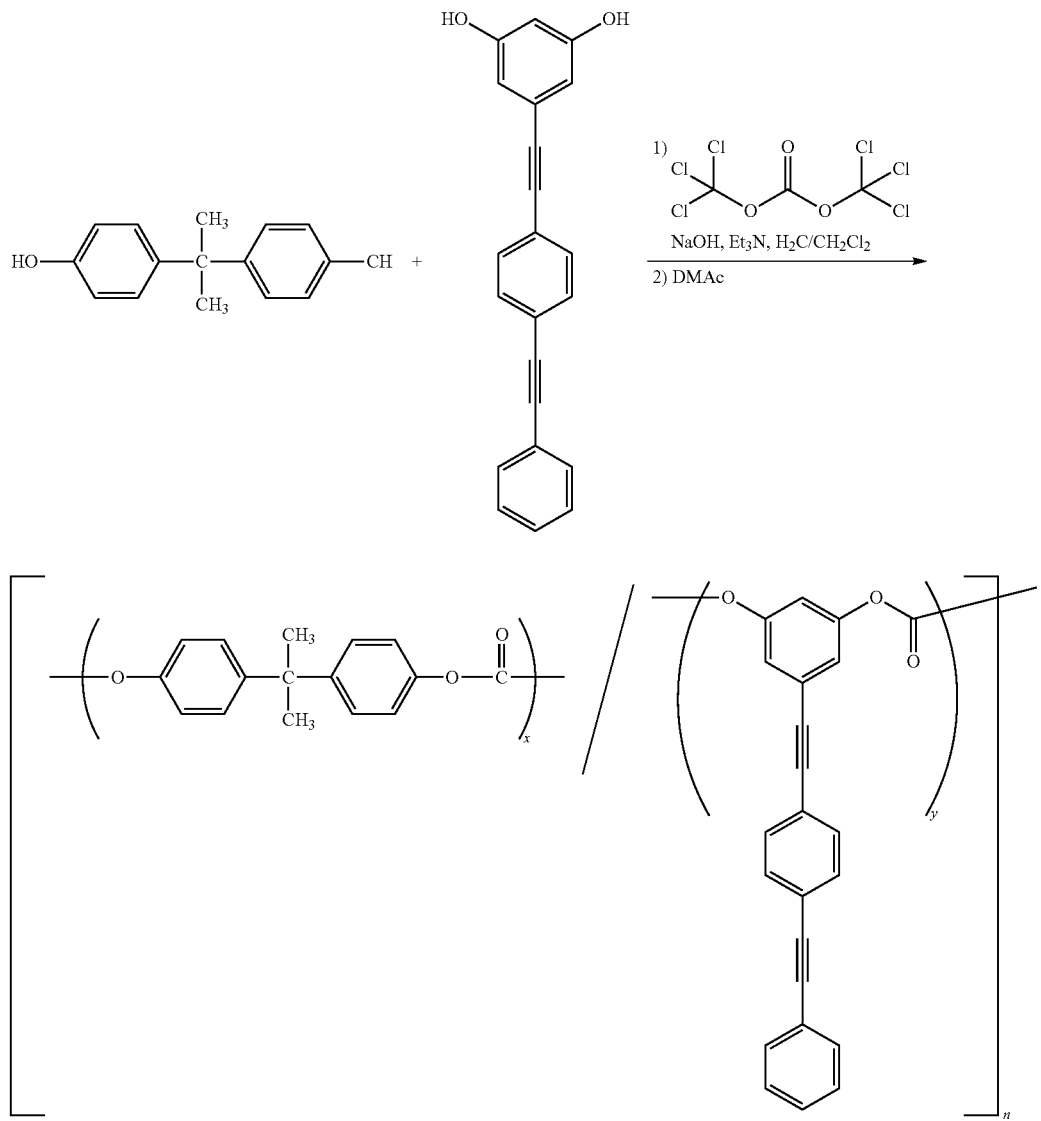

1.50 g of 2,2-bis(4-hydroxyphenyl)propane are placed in a 200 mL flask equipped with a mechanical agitator. Subsequently, 0.866 g of triphosgene dissolved in 27 ml of dichloromethane is added thereto, and the mixture is stirred for 15 minutes. Then, 6 mg of triethylamine is added thereto, and the obtained mixture is stirred at room temperature for 90 minutes. Then, the resultant is diluted with dichloromethane, washed with 1% aqueous hydrochloric acid solution and water, re-precipitated by using methanol, and vacuum-dried at 60° C. for 12 hours, to obtain polycarbonate.

In Reaction Scheme 3, x:y is about 8:2.

Synthesis Example 3

Steps 1 and 2 are the same in Synthesis Example 1.
Step 3:
1.50 g of sodium hydroxide, 22 mL of water, 0.699 g of 5-((4-(phenylethynyl)phenyl)ethynyl)benzene-1,3-diol, and 1.20 g of 2,2-bis(4-hydroxyphenyl)propane are placed in a 200 mL flask equipped with a mechanical agitator. Subsequently, 1.11 g of triphosgene dissolved in 48 ml of dichloromethane is added thereto, and the mixture is stirred for 15 minutes. Then, 7 mg of triethylamine is added thereto, and the mixture is stirred at room temperature for 90 minutes. Then, the resultant is diluted with dichloromethane, washed with 1% aqueous hydrochloric acid solution and water, re-precipitated by using methanol, and vacuum-dried at 60° C. for 12 hours, to obtain polycarbonate.

In Reaction Scheme 3, x:y is about 7:3.

Synthesis Example 4

Steps 1 and 2 are the same in Synthesis Example 1.
Step 3:
1.61 g of sodium hydroxide, 24 mL of water, 0.997 g of 5-((4-(phenylethynyl)phenyl)ethynyl)benzene-1,3-diol, and 1.10 g of 2,2-bis(4-hydroxyphenyl)propane are placed in a 200 mL flask equipped with a mechanical agitator. Subsequently, 0.975 g of triphosgene dissolved in 52 ml of dichloromethane is added thereto, and the mixture is stirred for 15 minutes. Next, 6 mg of triethylamine is added thereto, and the obtained mixture is stirred at room temperature for 90 minutes. Then, the resultant is diluted with dichloromethane, washed with 1% aqueous hydrochloric acid solution and water, re-precipitated by using methanol, and vacuum-dried at 60° C. for 12 hours, to obtain polycarbonate.

In Reaction Scheme 3, x:y is about 6:4.

A 20 percent by weight (wt %) polycarbonate solution is prepared by dissolving each polycarbonate according to Synthesis Examples 1 to 4 in a mixed solvent of tetrahydrofuran and dioxane (1/1, volume to volume (v/v)). Subsequently, the polycarbonate solution is coated on a glass substrate and dried at 40° C. for 1 hour and then, at 80° C. for 1 hour, to form a thin film. The thin film is taken from the glass substrate, to manufacture a 100 μm-thick polycarbonate film.

Evaluation 1

The yellow index and light transmittance of the polycarbonate film are measured.

The yellow index and the light transmittance are measured with transmitted light according to ASTMD1925 by using a spectrum colorimeter, MC-3600d (Konica Minolta Inc.), and light transmittance is at least once measured by using MC-3600d (Konica Minolta Inc.) and then, averaged.

The results are provided in Table 1.

TABLE 1

| | Yellow index (YI, %) | Light transmittance (%) |
|---|---|---|
| Synthesis Example 1 | 1.33 | 88.4 |
| Synthesis Example 2 | 2.83 | 87.0 |
| Synthesis Example 3 | 3.64 | 87.9 |
| Synthesis Example 4 | 4.30 | 86.9 |

Referring to Table 1, the polycarbonate films respectively formed of each polycarbonate according to Synthesis Examples 1 to 4 have satisfactory yellow index and light transmittance.

Manufacture of Compensation Film

Example 1

A compensation film having a thickness of 46 micrometers (μm) is manufactured by elongating the polycarbonate film made of the polycarbonate according to Synthesis Example 1 at 180° C. at an elongation rate of 240% in a uniaxial direction.

Example 2

A compensation film having a thickness of 56 μm is manufactured by elongating the polycarbonate film made of the polycarbonate according to Synthesis Example 1 at 230° C. at an elongation rate of 180% in a uniaxial direction.

Example 3

A compensation film having a thickness of 56 μm is manufactured by elongating the polycarbonate film made of the polycarbonate according to Synthesis Example 2 at 180° C. at an elongation rate of 180% in a uniaxial direction.

Example 4

A compensation film having a thickness of 52 μm is manufactured by elongating the polycarbonate film made of the polycarbonate according to Synthesis Example 2 at 180° C. at an elongation rate of 200% in a uniaxial direction.

Example 5

A compensation film having a thickness of 45 μm is manufactured by elongating the polycarbonate film made of the polycarbonate according to Synthesis Example 2 at 180° C. at an elongation rate of 240% in a uniaxial direction.

Example 6

A compensation film having a thickness of 54 μm is manufactured by elongating the polycarbonate film made of the polycarbonate according to Synthesis Example 2 at 210° C. at an elongation rate of 180% in a uniaxial direction.

Example 7

A compensation film having a thickness of 54 μm is manufactured by elongating the polycarbonate film made of the polycarbonate according to Synthesis Example 2 at 230° C. at an elongation rate of 180% in a uniaxial direction.

Example 8

A compensation film having a thickness of 51 μm is manufactured by elongating the polycarbonate film made of the polycarbonate according to Synthesis Example 3 at 180° C. at an elongation rate of 180% in a uniaxial direction.

Example 9

A compensation film having a thickness of 46 μm is manufactured by elongating the polycarbonate film made of the polycarbonate according to Synthesis Example 3 at 180° C. at an elongation rate of 200% in a uniaxial direction.

Example 10

A compensation film having a thickness of 40 μm is manufactured by elongating the polycarbonate film made of the polycarbonate according to Synthesis Example 3 at 180° C. at an elongation rate of 240% in a uniaxial direction.

Example 11

A compensation film having a thickness of 49 μm is manufactured by elongating the polycarbonate film made of the polycarbonate according to Synthesis Example 3 at 210° C. at an elongation rate of 180% in a uniaxial direction.

Example 12

A compensation film having a thickness of 51 μm is manufactured by elongating the polycarbonate film made of the polycarbonate according to Synthesis Example 3 at 230° C. at an elongation rate of 180% in a uniaxial direction.

Example 13

A compensation film having a thickness of 48 μm is manufactured by elongating the polycarbonate film made of the polycarbonate according to Synthesis Example 4 at 180° C. at an elongation rate of 200% in a uniaxial direction.

Example 14

A compensation film having a thickness of 46 μm is manufactured by elongating the polycarbonate film made of the polycarbonate according to Synthesis Example 4 at 180° C. at an elongation rate of 240% in a uniaxial direction.

Example 15

A compensation film having a thickness of 51 μm is manufactured by elongating the polycarbonate film made of the polycarbonate according to Synthesis Example 4 at 230° C. at an elongation rate of 200% in a uniaxial direction.

Evaluation 2

In-phase retardation values, thickness direction retardation values, and wavelength dispersion of the compensation film according to Examples 1 to 15 are evaluated.

The in-phase retardation values and thickness direction retardation values are measured using an Axoscan equipment (Axometrics, Inc.).

Wavelength dispersion of in-phase retardation values and in-phase retardation values are shown in Table 2.

TABLE 2

|  | $R_0$ (550 nm) | $R_{th}$ (550 nm) | $R_0$ (450 nm)/ $R_0$(550 nm) | $R_0$ (650 nm)/ $R_0$(550 nm) |
|---|---|---|---|---|
| Example 1 | 242 | 99.6 | 1.17 | 0.81 |
| Example 2 | 30.5 | 15.6 | 1.12 | 0.95 |
| Example 3 | 170.1 | 100.2 | 1.26 | 0.90 |
| Example 4 | 283.2 | 99.9 | 1.24 | 0.90 |
| Example 5 | 131.1 | 58.2 | 1.13 | 0.86 |
| Example 6 | 19.4 | 15.9 | 1.37 | 0.86 |
| Example 7 | 19.6 | 8.97 | 1.35 | 0.87 |
| Example 8 | 141 | 60.5 | 0.96 | 1.06 |
| Example 9 | 146 | 60.1 | 0.90 | 1.08 |
| Example 10 | 65.8 | 57.4 | 0.93 | 1.18 |
| Example 11 | 76.3 | 65 | 0.92 | 1.04 |
| Example 12 | 75.6 | 35.6 | 0.95 | 1.03 |
| Example 13 | 204 | 89.5 | 0.98 | 1.05 |
| Example 14 | 224 | 92.4 | 0.88 | 1.09 |
| Example 15 | 216 | 87.5 | 0.97 | 1.05 |

Referring to Table 2, the compensation films according to Examples 1 to 15 have a forward wavelength dispersion phase delay where a retardation of light at a shorter wavelength is larger than a retardation of light at a longer wavelength or a reverse wavelength dispersion phase delay where a retardation of light at a longer wavelength is larger than a retardation of light at a shorter wavelength. Specifically, the compensation films according to Examples 1 to 7 have a forward wavelength dispersion phase delay and the compensation films according to Examples 8 to 15 have a reverse wavelength dispersion phase delay. From these results, it is found that compensation films having desirable retardation values and wavelength dispersion may be produced by controlling various factors such as content ratios of a polymer, and elongation temperatures and elongation rates of films.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:

1. A polymer comprising a first structural unit represented by Chemical Formula 1:

Chemical Formula 1

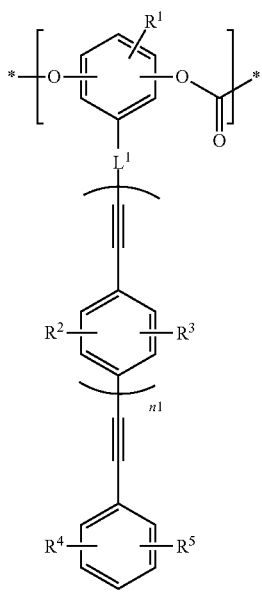

wherein, in Chemical Formula 1,
L$^1$ is a single bond, O, C(=O), C(=O)O, or C(=O)NR$^a$,
R$^1$ to R$^5$ and R$^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

2. The polymer of claim 1, wherein the first structural unit is represented by Chemical Formula 1-1:

Chemical Formula 1-1

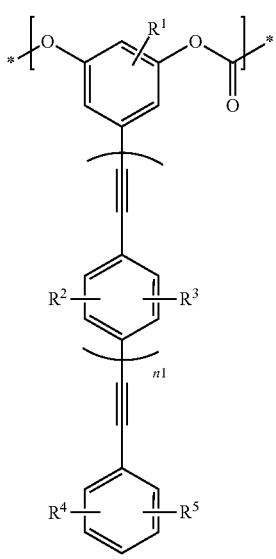

wherein, in Chemical Formula 1-1,
R$^1$ to R$^5$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

3. The polymer of claim 1, wherein the polymer further comprises a second structural unit represented by Chemical Formula 2:

Chemical Formula 2

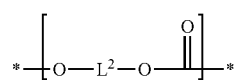

wherein, in Chemical Formula 2,
L$^2$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, a group represented by Chemical Formula A, or a combination thereof, Chemical Formula A

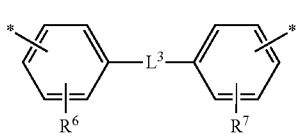

wherein, in Chemical Formula A,
L$^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, SiR$^b$R$^c$, S, SO$_2$, or a combination thereof, and
R$^6$, R$^7$, R$^b$, and R$^c$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

4. The polymer of claim 3, wherein the second structural unit is represented by one of Chemical Formulae 2-1 to 2-10:

Chemical Formula 2-1

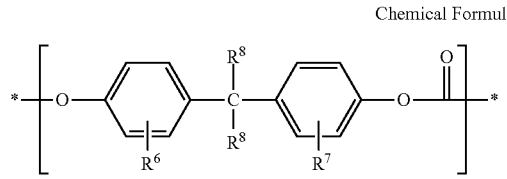

Chemical Formula 2-2

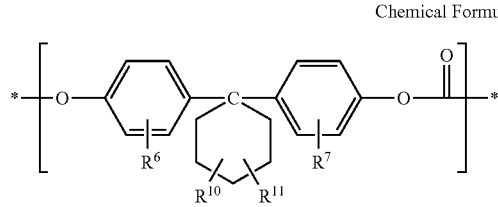

-continued

Chemical Formula 2-3
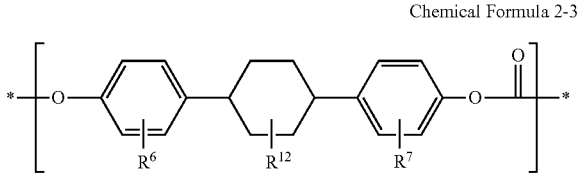

Chemical Formula 2-4
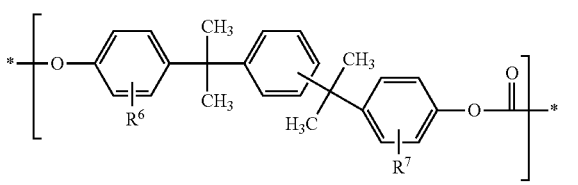

Chemical Formula 2-5
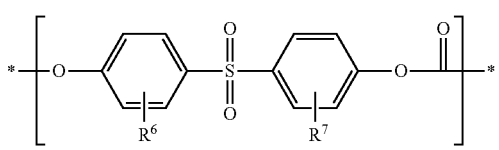

Chemical Formula 2-6
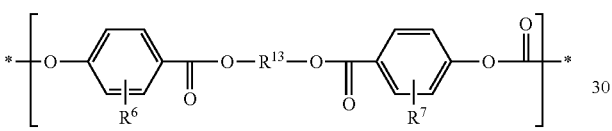

Chemical Formula 2-7
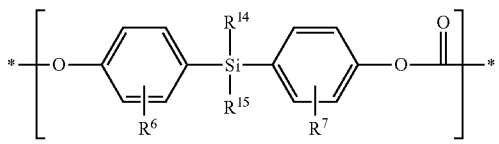

Chemical Formula 2-8
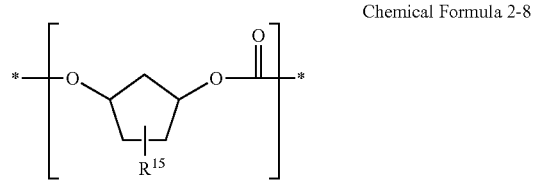

Chemical Formula 2-9
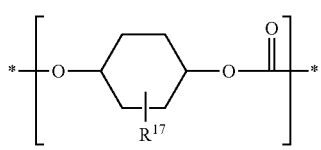

Chemical Formula 2-10
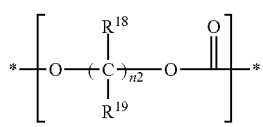

wherein, in Chemical Formulae 2-1 to 2-10, $R^6$ to $R^{12}$ and $R^{14}$ to $R^{19}$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and $R^{13}$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group or a combination thereof.

5. The polymer of claim 3, wherein a mole ratio of the first structural unit and the second structural unit is about 1:99 to about 99:1.

6. The polymer of claim 3, wherein a mole ratio of the first structural unit and the second structural unit is about 1:99 to about 50:50.

7. A compensation film comprising a first polymer comprising a first structural unit represented by Chemical Formula 16:

Chemical Formula 1
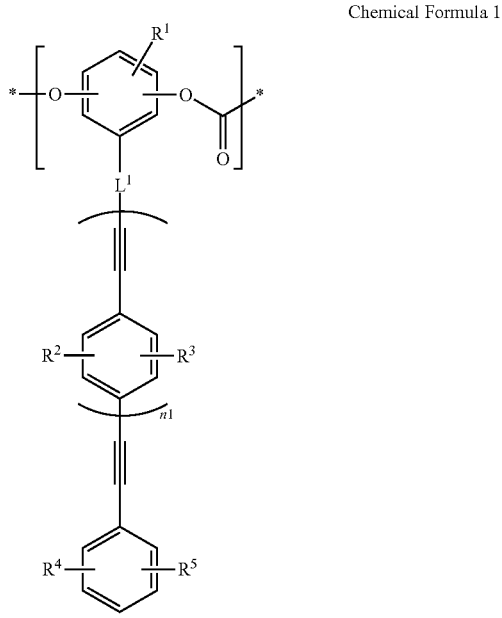

wherein, in Chemical Formula 1, $L^1$ is a single bond, O, C(=O), C(=O)O, or C(=O)NR$^a$, $R^1$ to $R^5$ and $R^a$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

8. The compensation film of claim 7, wherein the first structural unit is represented by Chemical Formula 1-1:

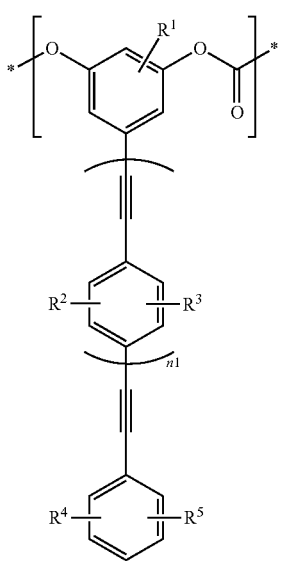

Chemical Formula 1-1 wherein, in Chemical Formula 1-1, $R^1$ to $R^5$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and n1 is 1 to 5.

9. The compensation film of claim 7, wherein the first polymer further comprises a second structural unit represented by Chemical Formula 2:

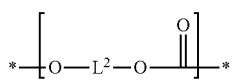

Chemical Formula 2 wherein, in Chemical Formula 2, $L^2$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, a group represented by Chemical Formula A, or a combination thereof,

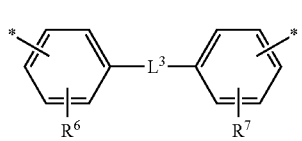

Chemical Formula A wherein, in Chemical Formula A, $L^3$ is a single bond, a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group, O, C(=O), C(=O)O, $SiR^bR^c$, S, $SO_2$, or a combination thereof, and $R^6$, $R^7$, $R^b$ and $R^c$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof.

10. The compensation film of claim 9, wherein the second structural unit is represented by one of Chemical Formulae 2-1 to 2-10:

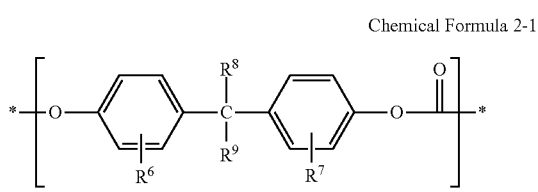

Chemical Formula 2-1

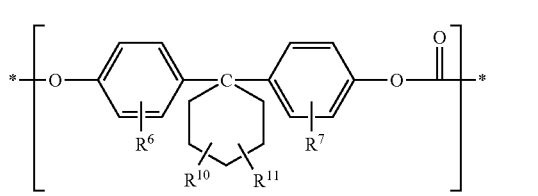

Chemical Formula 2-2

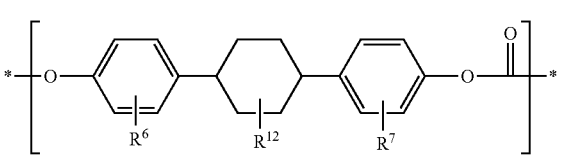

Chemical Formula 2-3

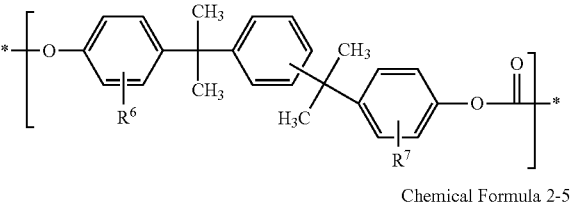

Chemical Formula 2-4

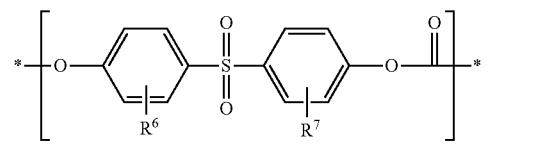

Chemical Formula 2-5

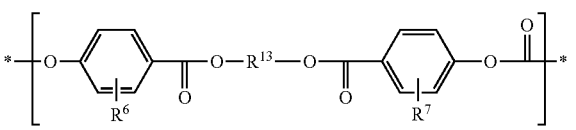

Chemical Formula 2-6

-continued

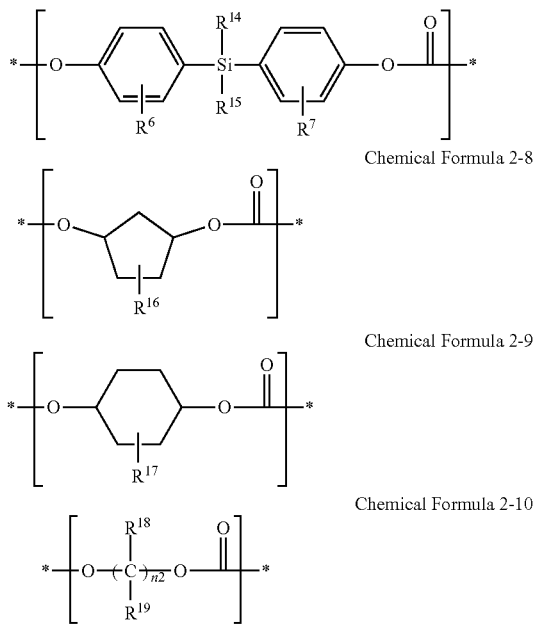

Chemical Formula 2-7

Chemical Formula 2-8

Chemical Formula 2-9

Chemical Formula 2-10 wherein, in Chemical Formulae 2-1 to 2-10,
$R^6$ to $R^{12}$ and $R^{14}$ to $R^{19}$ are independently hydrogen, a substituted or unsubstituted C1 to C20 alkyl group, a substituted or unsubstituted C1 to C20 alkoxy group, a substituted or unsubstituted C3 to C20 cycloalkyl group, a substituted or unsubstituted C6 to C20 aryl group, a substituted or unsubstituted C3 to C20 heterocyclic group, a substituted or unsubstituted silyl group, a hydroxy group, a halogen, a nitro group, or a combination thereof, and
$R^{13}$ is a substituted or unsubstituted C1 to C20 alkylene group, a substituted or unsubstituted C3 to C20 cycloalkylene group, a substituted or unsubstituted C6 to C20 arylene group, a substituted or unsubstituted C3 to C20 divalent heterocyclic group or a combination thereof.

11. The compensation film of claim 9, wherein the first polymer comprises the first structural unit and the second structural unit in a mole ratio of about 1:99 to about 99:1.

12. The compensation film of claim 9, wherein the first polymer comprises the first structural unit and the second structural unit in a mole ratio of about 1:99 to about 50:50.

13. The compensation film of claim 7, wherein the compensation film further comprises a second polymer that is different from the first polymer.

14. The compensation film of claim 7, wherein the compensation film is uniaxially or biaxially elongated.

15. The compensation film of claim 14, wherein the compensation film is about 1.1 times to about 5.0 times elongated.

16. The compensation film of claim 7, wherein in-phase retardation at a 550 nanometer wavelength of the compensation film is about 10 nanometers to about 300 nanometers.

17. The compensation film of claim 7, wherein retardation values at 450 nanometer wavelength, 550 nanometer wavelength, and 650 nanometer wavelength of the compensation film satisfy one of Relationship Equation 1 to 5:

| | |
|---|---|
| $R(450\ nm) \geq R(550\ nm) > R(650\ nm)$ | Relationship Equation 1 |
| $R(450\ nm) > R(550\ nm) \geq R(650\ nm)$ | Relationship Equation 2 |
| $R(450\ nm) = R(550\ nm) = R(650\ nm)$ | Relationship Equation 3 |
| $R(450\ nm) \leq R(550\ nm) < R(650\ nm)$ | Relationship Equation 4 |
| $R(450\ nm) < R(550\ nm) \leq R(650\ nm)$ | Relationship Equation 5 | wherein, in Relationship Equations 1 to 5,
R(450 nm) is in-phase retardation or thickness direction retardation at a 450 nanometer wavelength,
R(550 nm) is in-phase retardation or thickness direction retardation at a 550 nanometer wavelength, and
R(650 nm) is in-phase retardation or thickness direction retardation at a 650 nanometer wavelength.

18. The compensation film of claim 9, wherein the first polymer comprises the first structural unit and the second structural unit in a mole ratio of about 10:90 to about 20:80, and
retardation values at 450 nanometer wavelength, 550 nanometer wavelength, and 650 nanometer wavelength of the compensation film may satisfy one of Relationship Equations 1 to 3:

| | |
|---|---|
| $R(450\ nm) \geq R(550\ nm) > R(650\ nm)$ | Relationship Equation 1 |
| $R(450\ nm) > R(550\ nm) \geq R(650\ nm)$ | Relationship Equation 2 |
| $R(450\ nm) = R(550\ nm) = R(650\ nm)$ | Relationship Equation 3 | wherein, in Relationship Equations 1 to 3,
R(450 nm) is in-phase retardation or thickness direction retardation at a 450 nanometer wavelength,
R(550 nm) is in-phase retardation or thickness direction retardation at a 550 nanometer wavelength, and
R(650 nm) is in-phase retardation or thickness direction retardation at a 650 nanometer wavelength.

19. The compensation film of claim 9, wherein the first polymer comprises the first structural unit and the second structural unit in a mole ratio of about 30:70 to about 40:60, and
retardation values at 450 nanometer wavelength, 550 nanometer wavelength, and 650 nanometer wavelength of the compensation film may satisfy Relationship Equation 4 or 5:

| | |
|---|---|
| $R(450\ nm) \leq R(550\ nm) < R(650\ nm)$ | Relationship Equation 4 |
| $R(450\ nm) < R(550\ nm) \leq R(650\ nm)$ | Relationship Equation 5 | wherein, in Relationship Equations 4 and 5,
R(450 nm) is in-phase retardation or thickness direction retardation at a 450 nanometer wavelength,
R(550 nm) is in-phase retardation or thickness direction retardation at a 550 nanometer wavelength, and
R(650 nm) is in-phase retardation or thickness direction retardation at a 650 nanometer wavelength.

20. An optical film comprising the compensation film of claim 7 and a polarizer.

21. A display device comprising the compensation film of claim 7.

22. A display device comprising the optical film of claim 20.

* * * * *